(12) United States Patent
Shang et al.

(10) Patent No.: US 11,886,790 B2
(45) Date of Patent: Jan. 30, 2024

(54) METHOD AND SYSTEM FOR AUTOMATIC TEST WEBSITE LAYOUT

(71) Applicant: MICRO FOCUS LLC, Santa Clara, CA (US)

(72) Inventors: Er-Xin Shang, Shanghai (CN); Hua-Ming Zhai, Shanghai (CN); Tezeen Yu, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/395,041

(22) Filed: Aug. 5, 2021

(65) Prior Publication Data

US 2023/0044682 A1 Feb. 9, 2023

(51) Int. Cl.
*G06F 40/106* (2020.01)

(52) U.S. Cl.
CPC .................... *G06F 40/106* (2020.01)

(58) Field of Classification Search
CPC .................................................. G06F 40/106
See application file for complete search history.

(56) References Cited

U.S. PATENT DOCUMENTS

| | | | |
|---|---|---|---|
| 9,043,698 B2 | 5/2015 | Tucovic | |
| 9,667,831 B2 | 5/2017 | Kobayashi | |
| 9,836,385 B2 | 12/2017 | Malla | |
| 10,146,419 B2 | 12/2018 | Geva et al. | |
| 10,789,412 B2 | 9/2020 | Abrahami et al. | |
| 2010/0058215 A1* | 3/2010 | Chung | H04N 21/47205 715/825 |
| 2011/0173589 A1 | 7/2011 | Guttman et al. | |
| 2013/0104015 A1* | 4/2013 | Nonaka | G06F 40/174 715/204 |
| 2018/0068470 A1* | 3/2018 | Croft | G06F 16/26 |
| 2018/0196805 A1* | 7/2018 | Kamerman | G06F 16/583 |
| 2019/0114308 A1* | 4/2019 | Hancock | G06F 40/106 |
| 2019/0163725 A1* | 5/2019 | da Silva | G06F 40/106 |
| 2019/0295378 A1* | 9/2019 | Penacho | G07F 17/3267 |
| 2020/0019583 A1 | 1/2020 | Halfond et al. | |

(Continued)

FOREIGN PATENT DOCUMENTS

CN 105740315 B 10/2019

OTHER PUBLICATIONS

Coyier, Chris, "CSS Media Queries & Using Available Space," Nov. 17, 2014, <https://css-tricks.com/css-media-queries/>, pp. 1-10. (Year: 2014).*

(Continued)

*Primary Examiner* — Kyle R Stork
(74) *Attorney, Agent, or Firm* — Sheridan Ross P.C.

(57) ABSTRACT

Method and system to automatically verify the layout of a webpage on various screen sizes. The method includes retrieving screen size data associated with the webpage. The method further includes determining anchor points for the webpage based on the retrieved screen size data. The method also includes rendering the plurality of elements of the webpage based on the retrieved screen size data and the determined anchor points and identifying a respective location of each of the plurality of elements of the webpage to verify the layout of the plurality of elements of the webpage. If an error in the layout of the webpage is detected, a visual and/or audio alert is sent.

20 Claims, 17 Drawing Sheets

(56) References Cited

U.S. PATENT DOCUMENTS

2020/0249964 A1    8/2020   Fernandes et al.
2021/0099590 A1*   4/2021   Zhang ...................... G06F 8/61

OTHER PUBLICATIONS

Mahajan et al. "Automated Repair of Layout Cross Browser Issues Using Search-Basted Techniques," ISSTA 2017, Jul. 2017, 12 pages.

* cited by examiner

METHOD AND SYSTEM FOR AUTOMATIC TEST WEBSITE LAYOUT

FIELD

The disclosure relates generally to automatically testing the layout of a webpage and particularly to systems and methods for automatically testing the layout of a webpage on various screen sizes.

BACKGROUND

Today, users utilize many different devices to browse websites on the Internet. In view of this, webpages may automatically resize to adapt to different screen sizes. However, when a webpage is resized, webpage elements (text, images, links, menus, etc.) may overlap, disappear, change relative location, etc. Webpages need to be manually tested on various screen sized to ensure a particular screen size is supported. For example, the screen a user is viewing a webpage on may be narrower/wider and/or shorter/taller than the screen the webpage was designed on. However, the layout of a webpage should be relatively the same regardless of the screen size.

SUMMARY

These and other needs are addressed by the various embodiments and configurations of the present disclosure. The present disclosure can provide a number of advantages depending on the particular configuration. These and other advantages will be apparent from the disclosure contained herein.

Information on webpages is programmed into code (e.g., source code) that a browser interprets in order to display the webpage on a requesting device. The source code for a webpage may include document formatting, objects, parameters, positioning instructions, and other information. For example, webpages may use Hyper Text Markup Language (HTML) tags to specify the location of webpage elements (e.g., text, images, shapes, hyperlinks, programming objects, form fields, tables, menus, and other elements).

Display parameters may vary widely from device to device due to differences in screen size, resolution, processing power, and maximum download speeds. Formatting a webpage to be properly displayed across different devices with varying display parameters is important to website designers/developers and companies. Previously, website designer/developers had to manually create different formatting/layouts for each expected set of display parameters, which was obviously very time consuming.

Since webpages may be viewed on different devices (e.g., desktop computers, laptops, tablets, smart phones, etc.) with varying screen sizes, the webpages need to support the different screen sizes and maintain a similar layout on the different screen sizes. Website developers may use meta query on a webpage to automatically adapt the webpage to various screen sizes. A test engineer may then manually create different tests scripts to test the layout of the webpage on different screen sizes. Rather than having a test engineer manually generate test scripts for each supported screen size, a test script may be recorded using a test scripting tool. This recorded test script may then be modified for each screen size, and the layout of the webpage verified. A respective location of each element of the webpage may be compared to verify the layout of the webpage.

In some embodiments, element layout may be checked based on the border of the elements. Using this method, the border of the elements should not overlap. For example, if there are two images adjacent to each other on a webpage, the borders of these two images should not overlap when the screen size is decreased/made narrower. Verifying webpage layout may further include verifying the relative location of each element location. For example, elements should remain in the same row/column when viewed on different screens. For example, when a webpage is resized to be narrower, an element in the first row may be relocated to the second row, which would be an error in the webpage layout. In some embodiments, when a webpage is viewed on a smaller screen size, some elements may be collapsed. For example, elements that cannot be properly displayed may be collapsed into an expandable menu or thumbnails. In some embodiments, anchor points may be used to verify the layout of a webpage.

For example, the anchor points may specify the border of the webpage. During testing, the browser window may be resized pixel by pixel, with the anchor points changing from one screen size to the next. After each resizing the layout of the webpage is tested to see if there are any errors (e.g., overlap, missing elements, etc.). For example, if an element is outside the anchor points after resizing, this would be a layout error.

For example, there may be two anchor sizes 100×100 and 200×200. The test would perform the following steps:
(1) resize window pixel by pixel, for example:
100×100, 100×101, 100×102, 100×103 . . . 100×200
101×100, 101×101, 101×102, 101×103 101×200
102×100, 102×101, 102×102, 102×103 . . . 102×200
. . .
199×100, 199×101, 199×102, 199×103 . . . 199×200
In other words, the window size changes in both width and height.
The reverse may also be done going from larger to smaller:
200×200, 200×199, 200×198, 200×197 . . . 200×100
199×200, 199×199, 199×198, 199×197 . . . 199×100
198×200, 198×199, 198×198, 198×197 . . . 198×100
. . .
100×200, 100×199, 100×198, 100×197 . . . 100×100
(2) For width changes, from larger to smaller, the elements on the right of the webpage may disappear/become hidden, or may be shifted lower (increasing the row count). Changes in width are illustrated in FIGS. 4A-F.

Similarly for height changes, the relative location of elements in the webpage layout should not change. Changes in height are illustrated in FIGS. 3A-G.

In some embodiments, supported screen size data may be obtained with a Cascading Style Sheets (CSS) query combined with parsing an HTTP header. Other information such as language settings may also be obtained.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
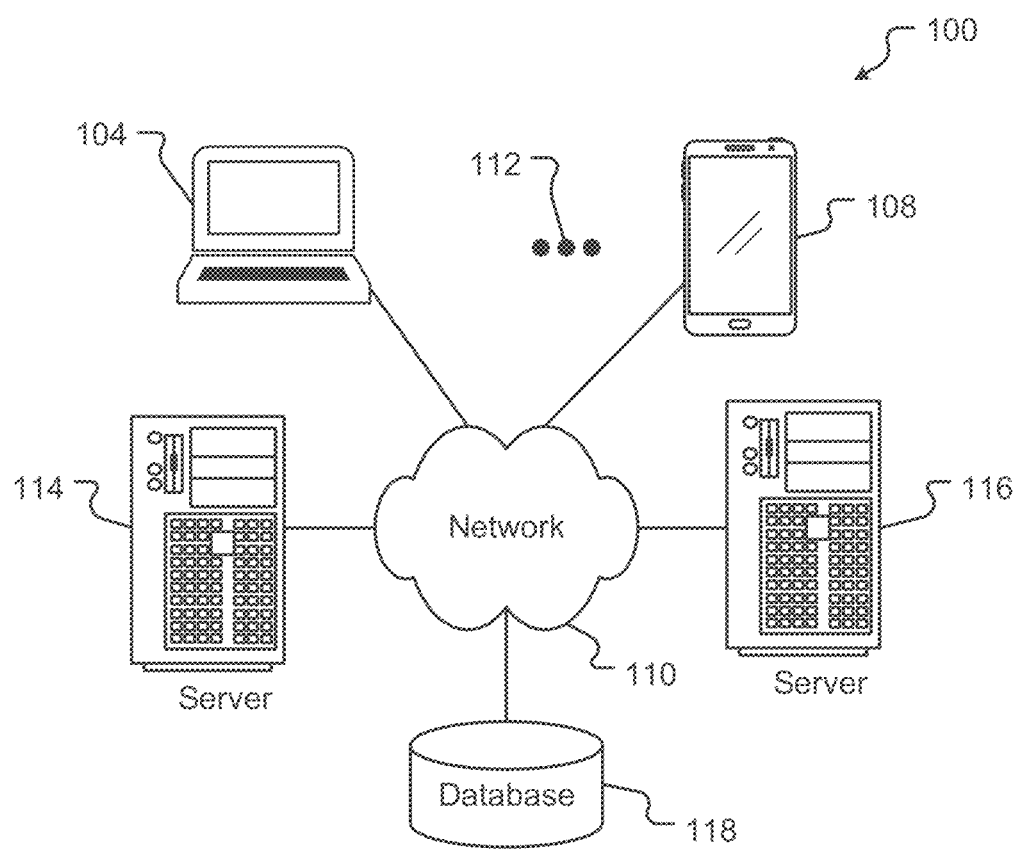
FIG. 1 is a block diagram illustrating elements of an example computing environment in which embodiments of the present disclosure may be implemented.

FIG. 1 is a block diagram illustrating elements of an example computing environment 100 in which embodiments of the present disclosure may be implemented. More specifically, this example illustrates a computing environment 100 that may function as the servers, user computers, or other systems provided and described herein. The environment 100 includes one or more user computers, or computing devices, such as a computer 104, a communication device 108, and/or more devices 112. The devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These devices 104, 108, 112 may also have any of a variety of applications, including for example, database client and/or server applications, and web browser applications. Alternatively, the devices 104, 108, 112 may be any other electronic device, such as a thin-client computer, Internet-enabled mobile telephone, and/or personal digital assistant, capable of communicating via a network 110 and/or playing audio, displaying images, etc. Although the example computer environment 100 is shown with two devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. For example, the servers 114 and 116 may comprise build servers, which may be used to test webpage layout on various screen sizes via the device 104, 108, 112. The servers 114 and 116 can be running an operating system including any of those discussed above, as well as any commercially available server operating systems. The servers 114 and 116 may also include one or more file and/or application servers, which can, in addition to an operating system, include one or more applications accessible by a client running on one or more of the devices 104, 108, 112. The server(s) 114 and/or 116 may be one or more general purpose computers capable of executing programs or scripts in response to the computers 104, 108, 112. As one example, the servers 114 and 116, may execute one or more automated tests. The automated tests may be implemented as one or more scripts or programs written in any programming language, such as Java™, C, C #®, or C++, and/or any scripting language, such as Perl, Python, or Tool Command Language (TCL), as well as combinations of any programming/scripting languages. The server(s) 114 and 116 may also include database servers, including without limitation those commercially available from Oracle®, Microsoft®, Sybase®, IBM® and the like, which can process requests from database clients running on the device 104, 108, 112.

The tests created and/or initiated by the device 104, 108, 112 (including tests created by other devices not illustrated) are shared to the server 114 and/or 116, which then may test and/or deploy the websites/webpages. The server 114 and/or 116 may transfer the generated webpage layout and/or data related to the same to the device 104, 108, 112. Although for ease of description, FIG. 1 illustrates two servers 114 and 116, those skilled in the art will recognize that the functions described with respect to servers 114, 116 may be performed by a single server and/or a plurality of specialized servers, depending on implementation-specific needs and parameters. The computer systems 104, 108, 112, and servers 114 116 may function as the system, devices, or components described herein.

The environment 100 may also include a database 118. The database 118 may reside in a variety of locations. By way of example, database 118 may reside on a storage medium local to (and/or resident in) one or more of the computers/servers 104, 108, 112, 114, 116. Alternatively, it may be remote from any or all of the computers/servers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers/servers 104, 108, 112, 114, 116 may be stored locally on the respective computer/server and/or remotely, as appropriate. The database 118 may be used to store webpage layout data (e.g., respective locations of a plurality of elements), alerts, etc.

Figure 2:
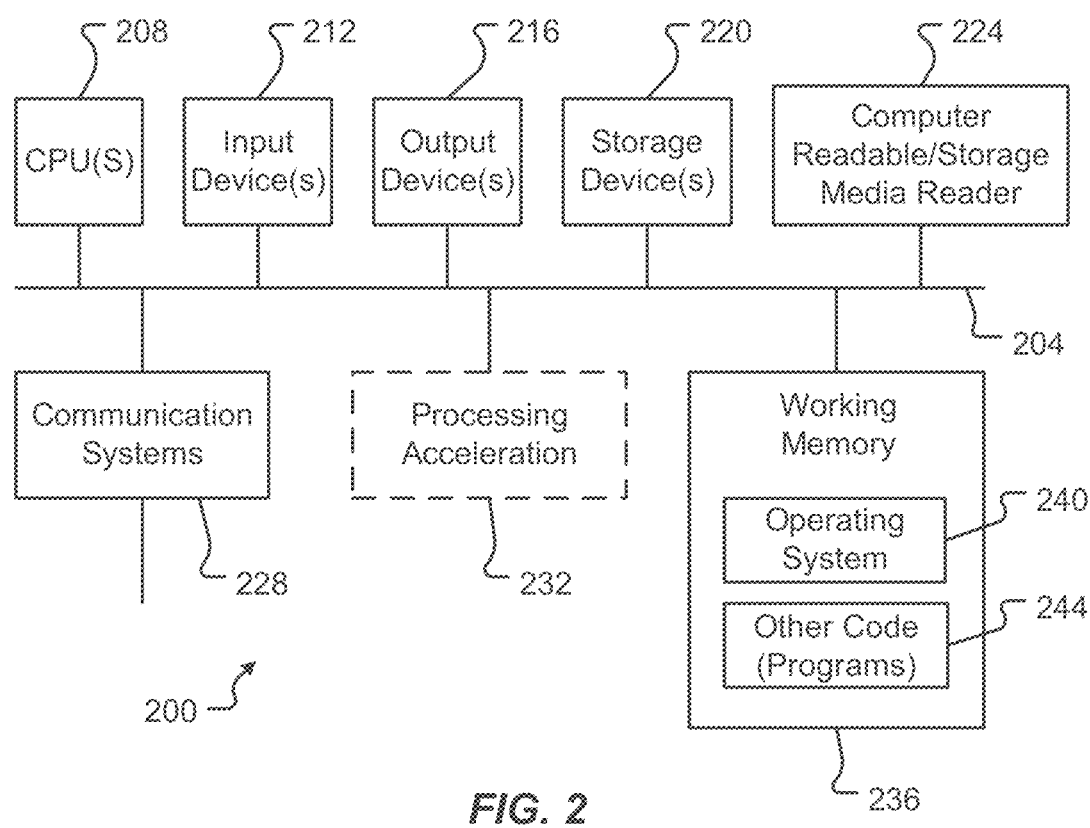
FIG. 2 is a block diagram illustrating elements of an example computing system in which embodiments of the present disclosure may be implemented.

FIG. 2 is a block diagram illustrating elements of an example computing system 200 in which embodiments of the present disclosure may be implemented. More specifically, this example illustrates one embodiment of a computer system 200 upon which the servers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computers such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJ-S™ processors, other industry-equivalent processors, and may perform computational functions using any known or future-developed standard, instruction set, libraries, and/or architecture.

FIGS. 3A-G illustrate the layout of a webpage 300 on various screen sizes (varying in height). When the height changes (taller or shorter), the layout should not change.

Figure 3A:
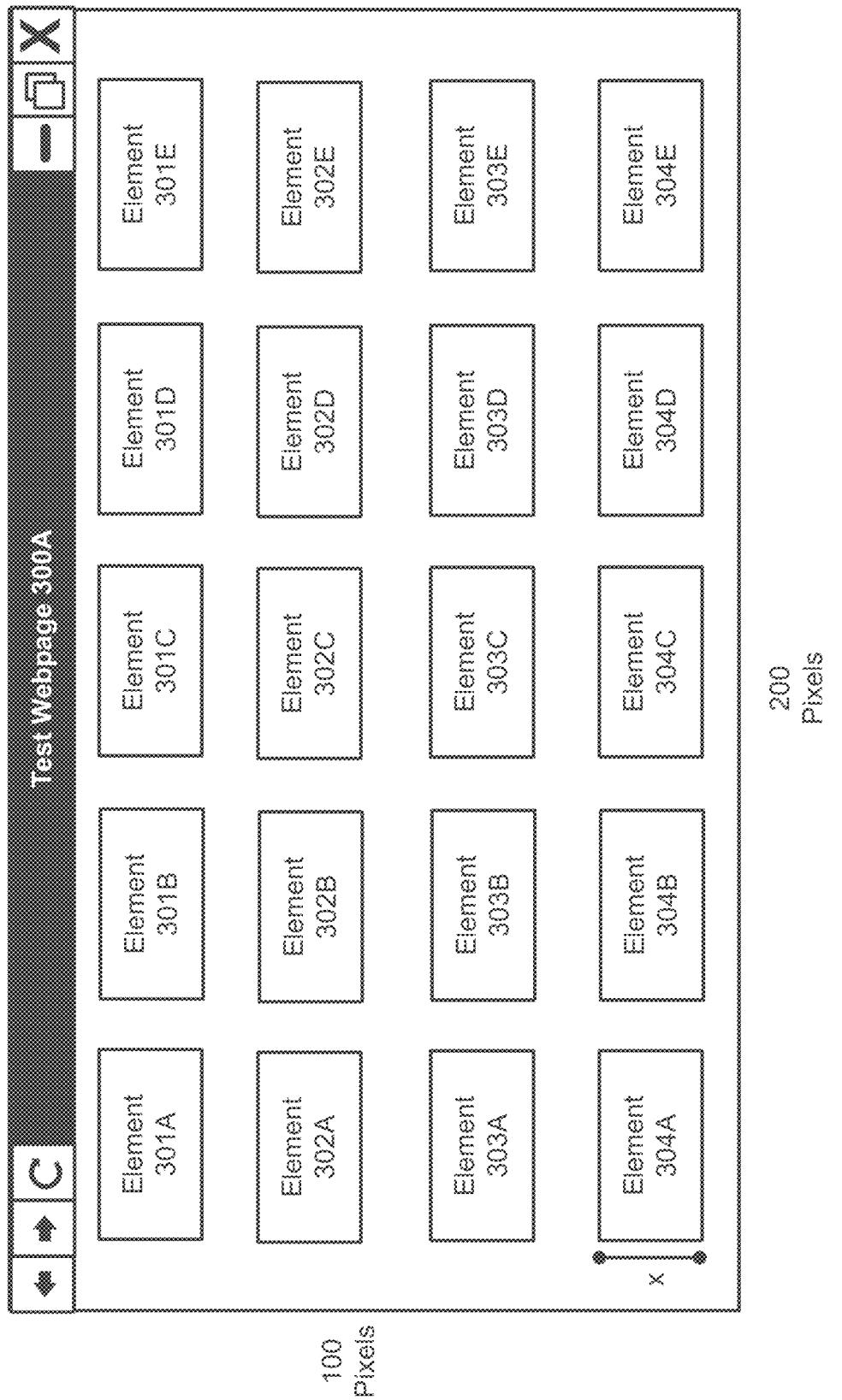
FIGS. 3A-G are diagrams illustrating various examples of different screen sizes and webpage elements according to one embodiment of the present disclosure.

Referring to FIG. 3A, the test webpage 300A is illustrated on a screen size of 100 pixels (vertically) by 200 pixels (horizontally). The test webpage 300A has a plurality of elements 301A-E-304A-E. A first row of elements 301A-E. a second row of elements 302A-E, a third row of elements 303A-D. and a fourth row of elements 304A-E. The elements 301-304A-E may represent any webpage elements (e.g., text, images, shapes, hyperlinks, programming objects, form fields, tables, menus, and other elements).

Figure 3B:
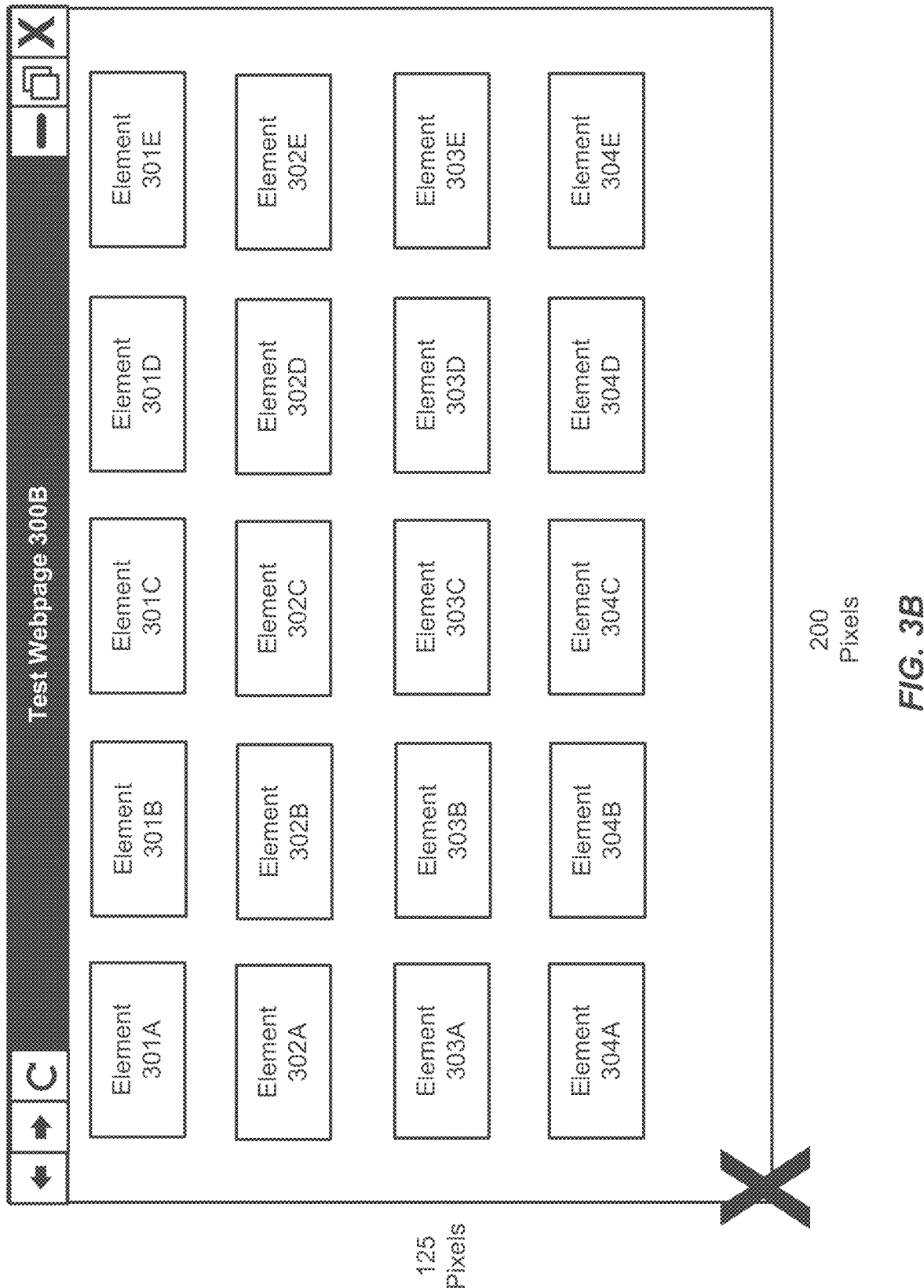

In FIG. 3B, the screen is resized to 125 pixels (vertically) by 200 pixels (horizontally). In other words, the height of the screen is increased from FIG. 3A. The test webpage 300B illustrates an example of how the layout of the test webpage 300A may be displayed on the resized screen. As illustrated in FIG. 3B, the elements are not resized according to the increased height and there is empty space at the bottom of the test webpage 300B, which may be an error in the layout that triggers an alert. For example, with the test script compares the border of the webpage to the relative location of the fourth row, the script detects that the space between the fourth row and the border of the webpage is larger than it should be. The alert may be a visual, audio, or other type of alert that there is an error in the webpage layout. In some embodiments, the automated test script may ask prompt for corrective action. For example, the user may indicate the elements 301-304A-E should be made larger.

Figure 3C:
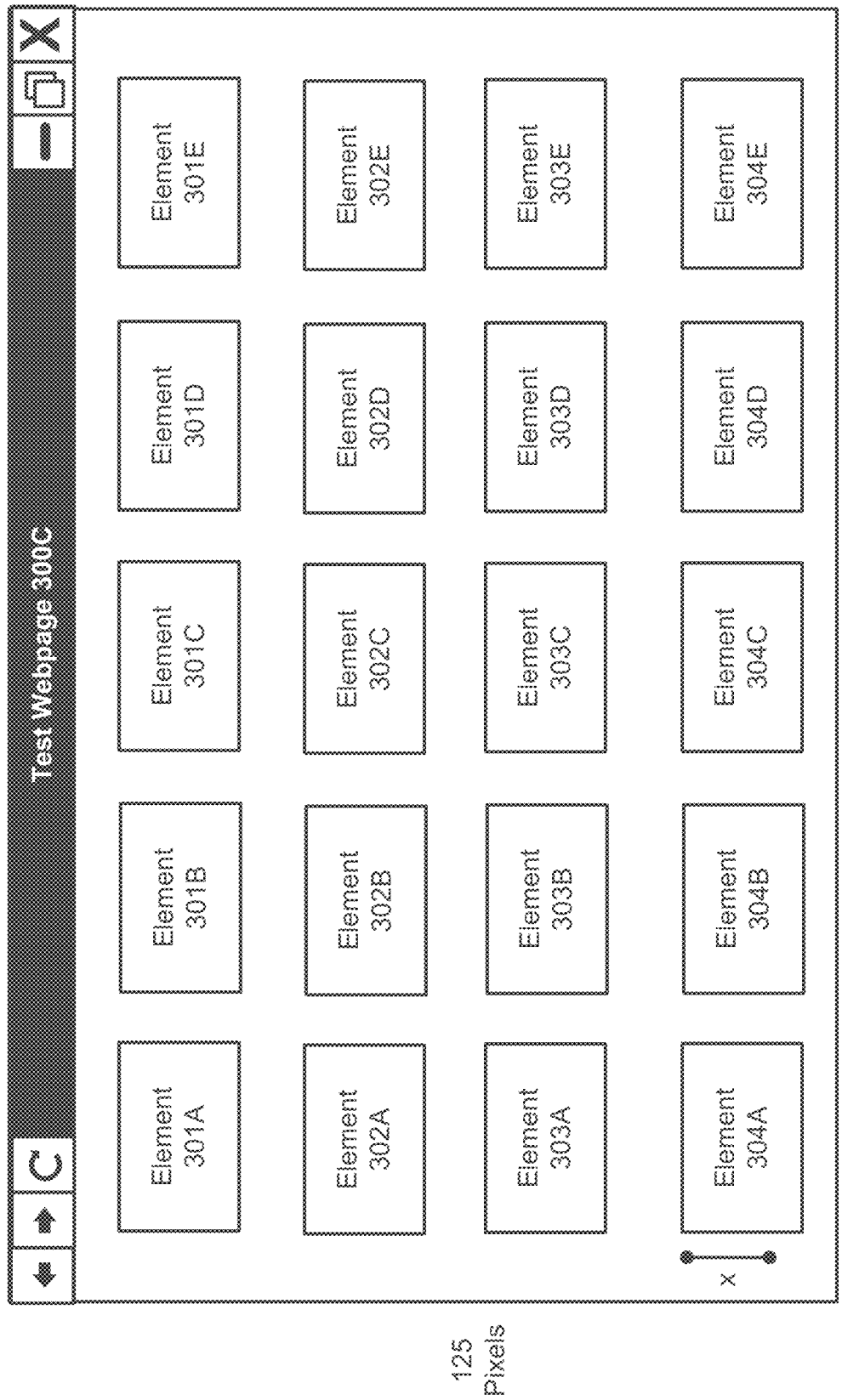

FIG. 3C illustrates a test webpage 300C with the elements 301A-E-304A-E resized to accommodate the increased height of the screen. As can be seen each element is taller than the same element in FIG. 3A as depicted by the height indication ("x").

Figure 3D:
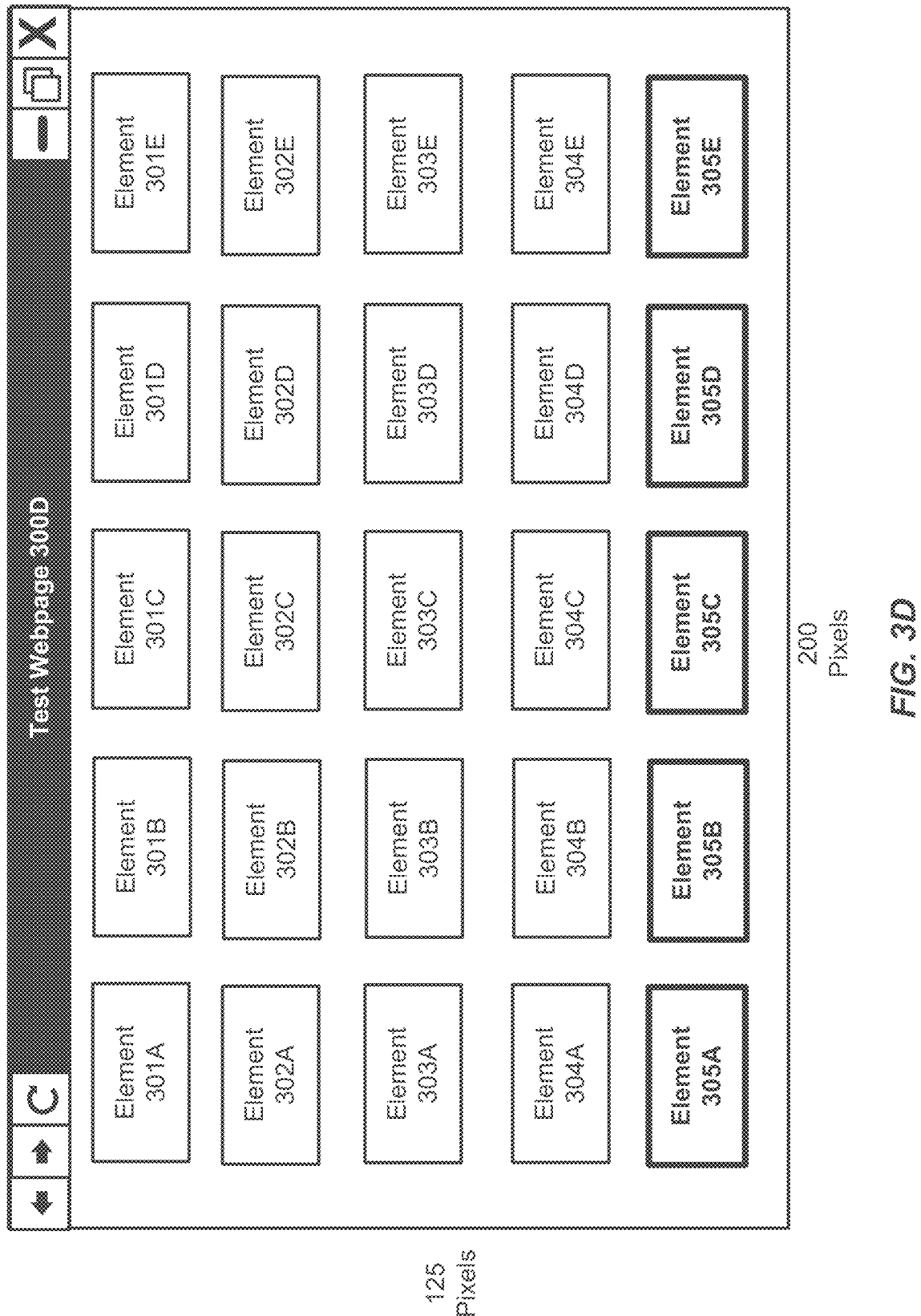

Alternatively, to resizing each element, additional elements may be displayed, as illustrated in FIG. 3D. As illustrated in FIG. 3D, an additional row of elements 305 is displayed. For example, when the screen size was smaller, the additional row of elements 305 may have been hidden or viewable via a collapsible menu, but now that there is more space, those additional elements may be displayed.

Figure 3E:
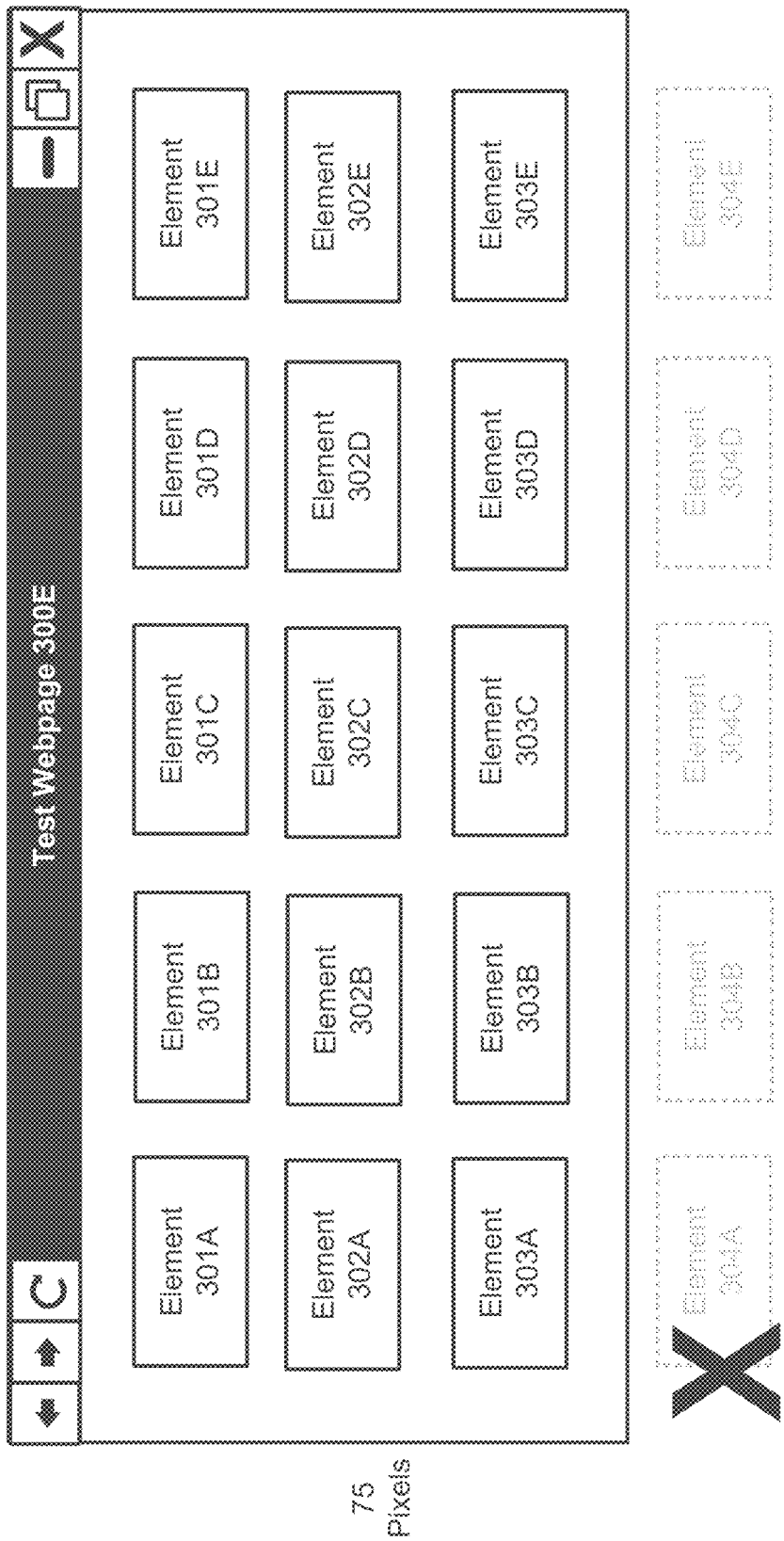

In FIG. 3E, the screen is resized to 75 pixels (vertically) by 200 pixels (horizontally). In other words, the height of the screen is decreased from FIG. 3A. The test webpage 300E illustrates an example of how the layout of the test webpage 300A may be displayed on the resized screen. As illustrated in FIG. 3E, the elements 301A-E-304A-E are not resized according to the decreased height and the elements 304A-E in the fourth row of elements 304A-E disappear or are hidden from view, as depicted by the dotted lines and grey text.

Figure 3F:
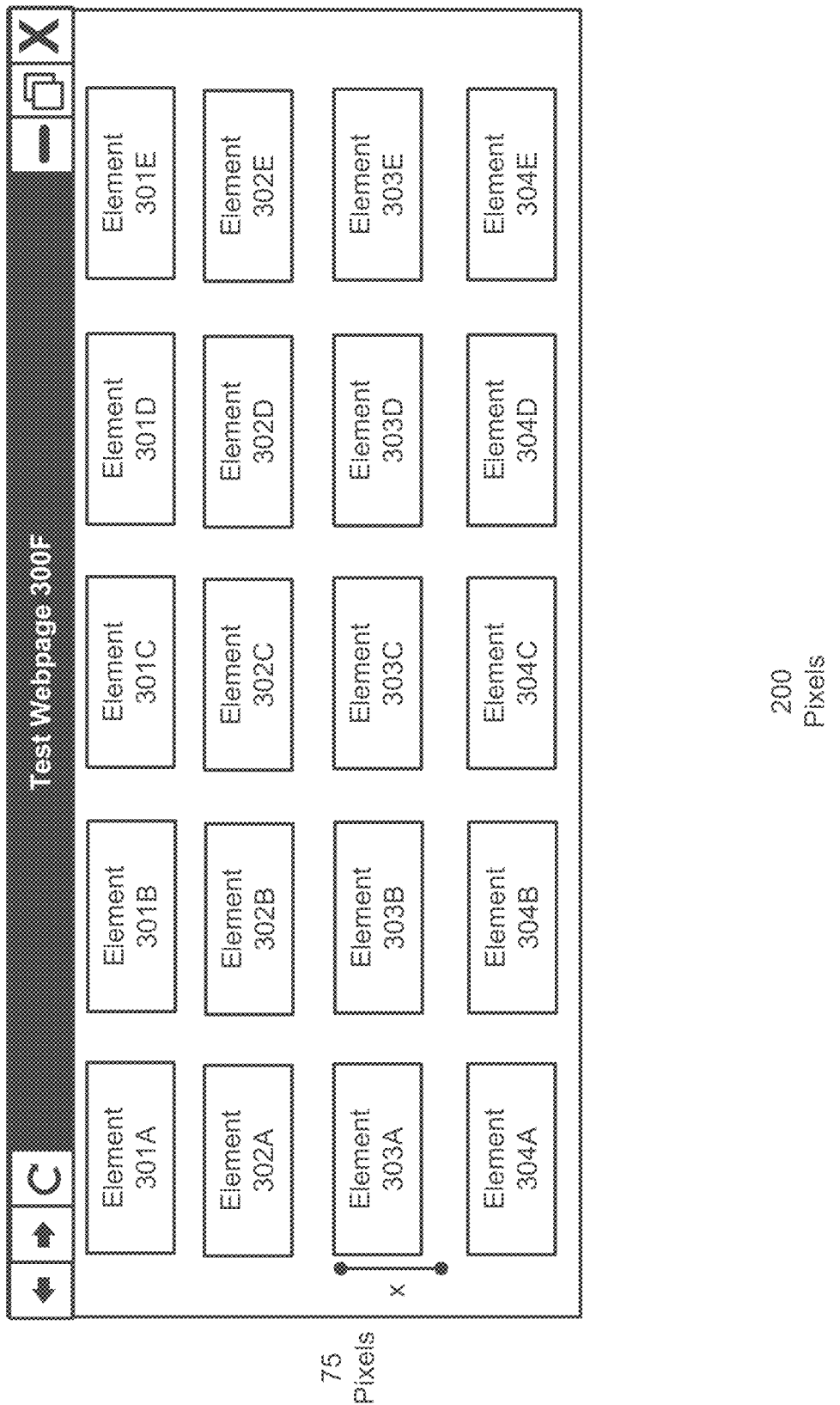

FIG. 3F illustrates a test webpage 300F with the elements 301A-E-304A-E resized to accommodate the decreased height of the screen. As can be seen each element is shorter than in FIG. 3A as depicted by the height indication ("x"). Now that each row of elements is narrower, all the rows may be displayed.

Figure 3G:
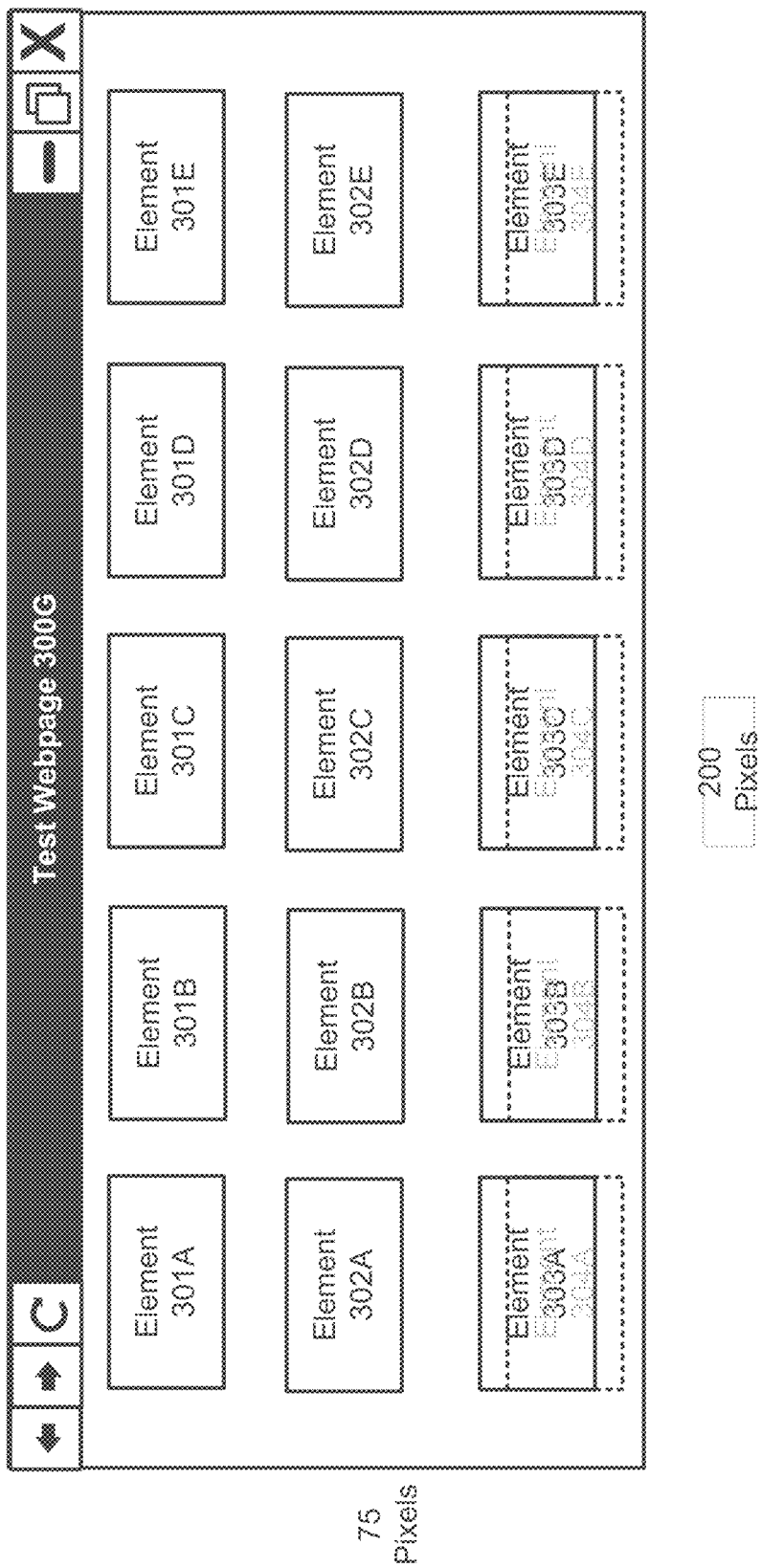

FIG. 3G illustrates the example when elements overlap after resizing. As illustrated in FIG. 3G, the fourth row of elements 304A-E overlaps the third row of elements 303A-E when the screen height is decreased. That is to say, there is an error in the relative location of the elements in the fourth row, the test script may detect that the fourth row of elements has a same location as the third row of elements, since the two rows overlap. The test identifies that the fourth row should have a lower relative location compared to the third row, and therefore an error is detected.

FIGS. 4A-F illustrate the layout of a webpage 400 on various screen sizes (varying in width). When the width changes (wider or narrower), the layout should not change.

Figure 4A:
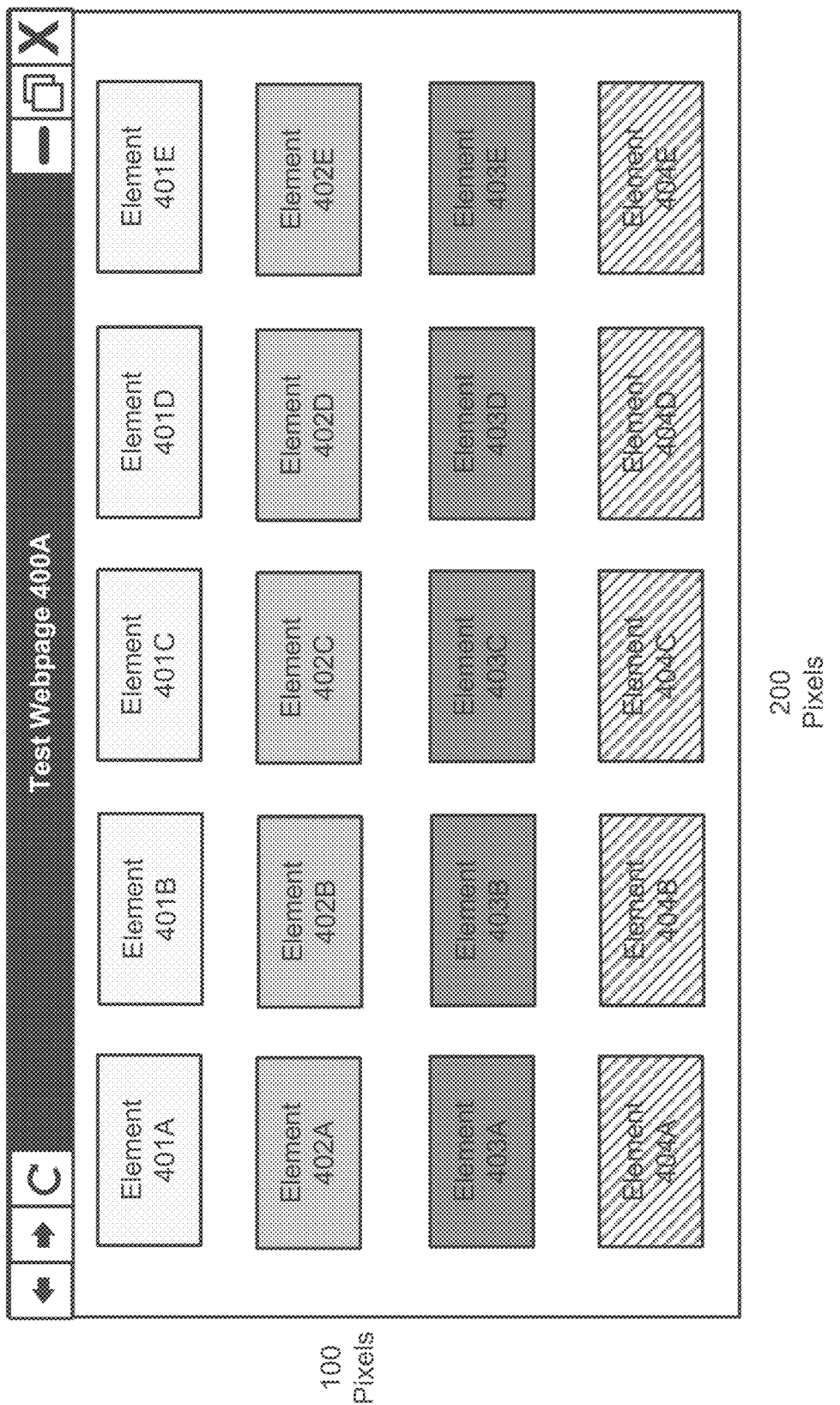
FIGS. 4A-F are diagrams illustrating examples various examples of different screen sizes and webpage elements according to one embodiment of the present disclosure.

Referring to FIG. 4A, the test webpage 400A is illustrated on a screen size of 100 pixels (vertically) by 200 pixels (horizontally). The test webpage 400A has a plurality of elements 401-404A-E. A first column of elements 401-404A. a second column of elements 401-404B, a third column of elements 401-404C. a fourth column of elements 401-404D, and a fifth column of elements 401-404E.

Figure 4B:
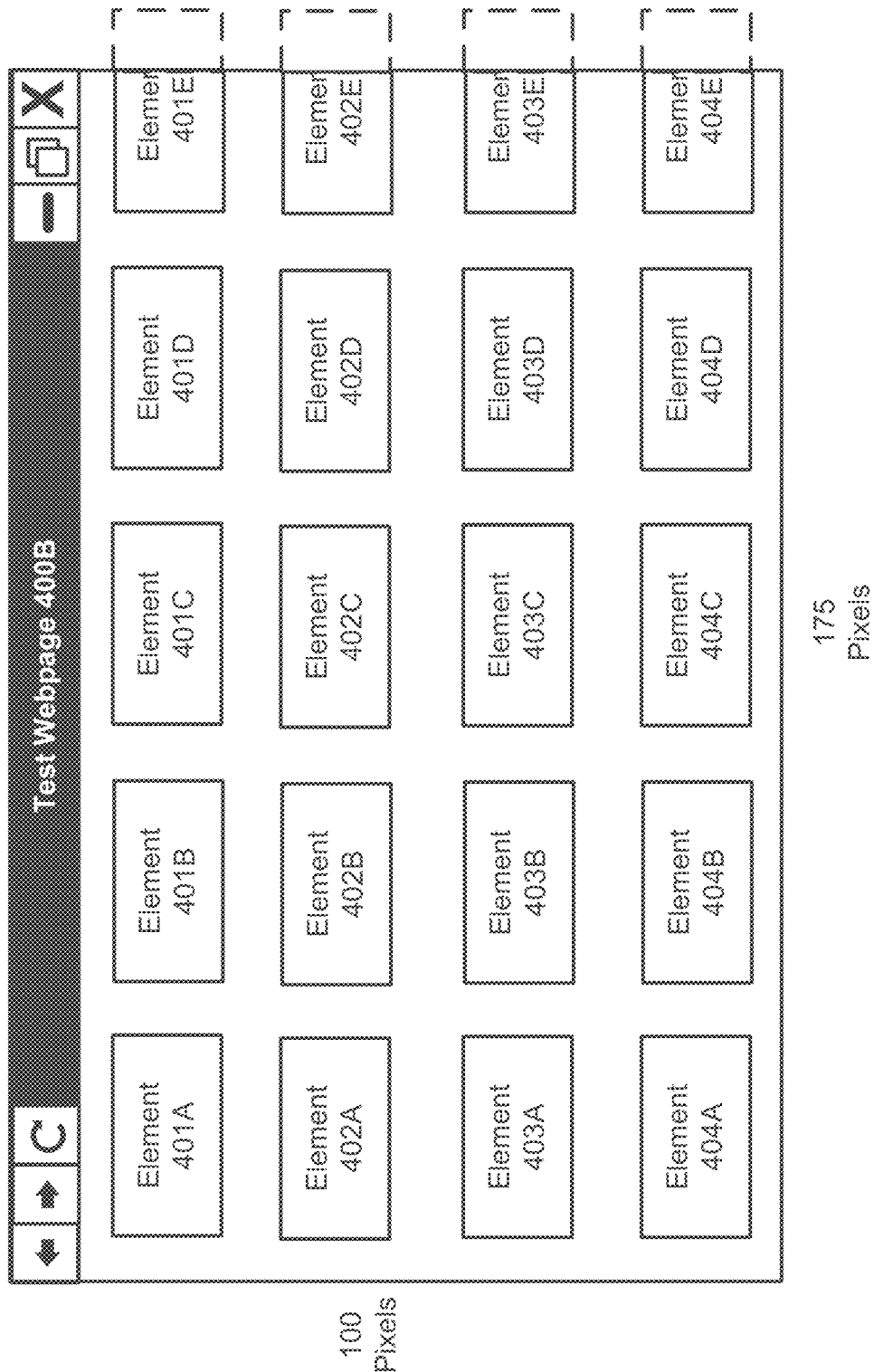

In FIG. 4B, the screen is resized to 100 pixels (vertically) by 175 pixels (horizontally). In other words, the width of the screen is decreased from FIG. 4A. The test webpage 400B illustrates an example of how the layout of the test webpage 400A may be displayed on the resized screen. As illustrated in FIG. 4B, the elements are not resized according to the decreased width and the fifth column of elements 401-404E are cut off. In other examples, the column of elements 401-404E may disappear completely. Alternatively, the first column of elements (401-404A) may be cut-off. The test script may detect that the borders of the fifth column of elements 401-404E are outside the border/anchor points of the webpage.

Figure 4C:
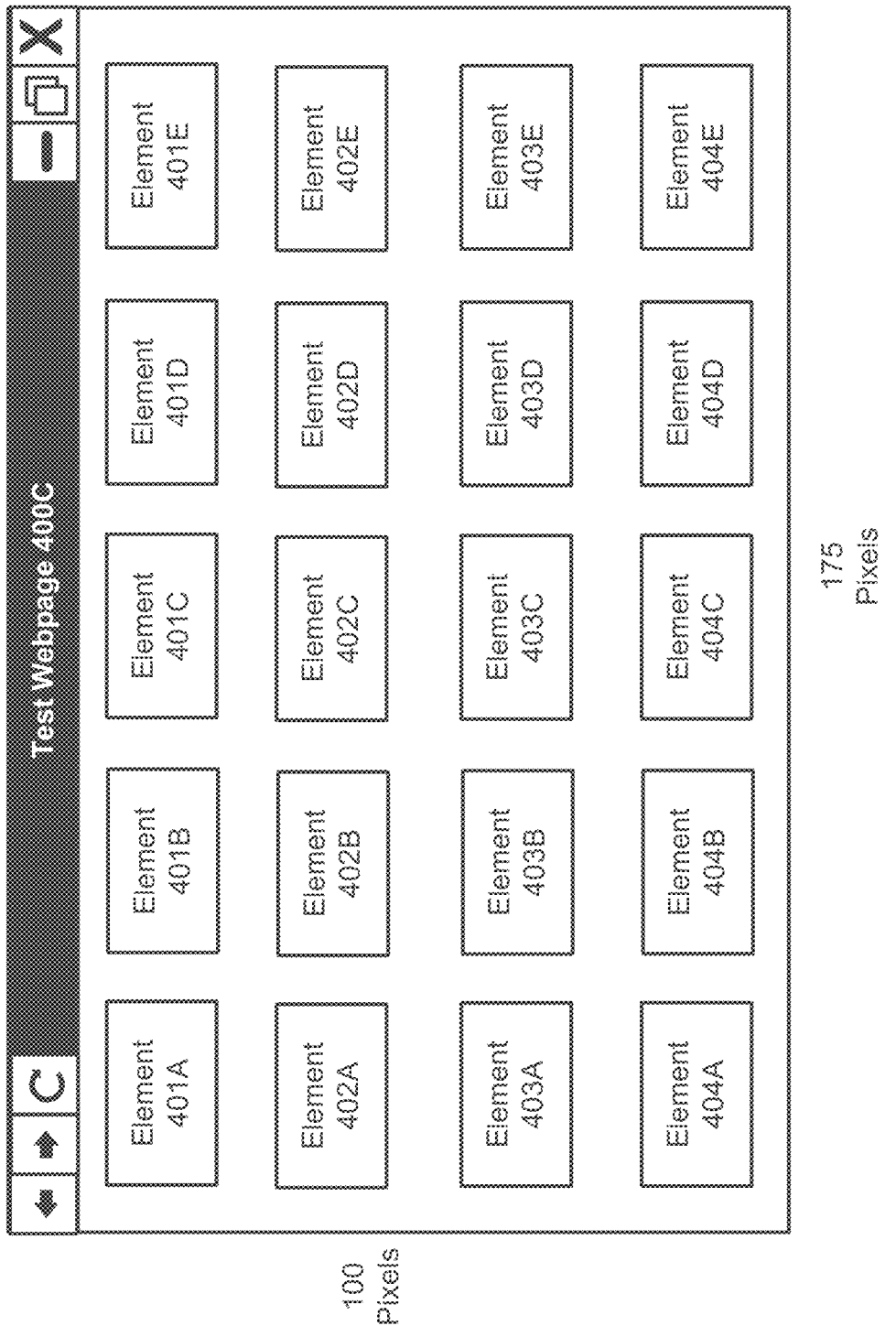

In FIG. 4C the elements are resized according to the narrower screen so that all elements are displayed.

Figure 4D:
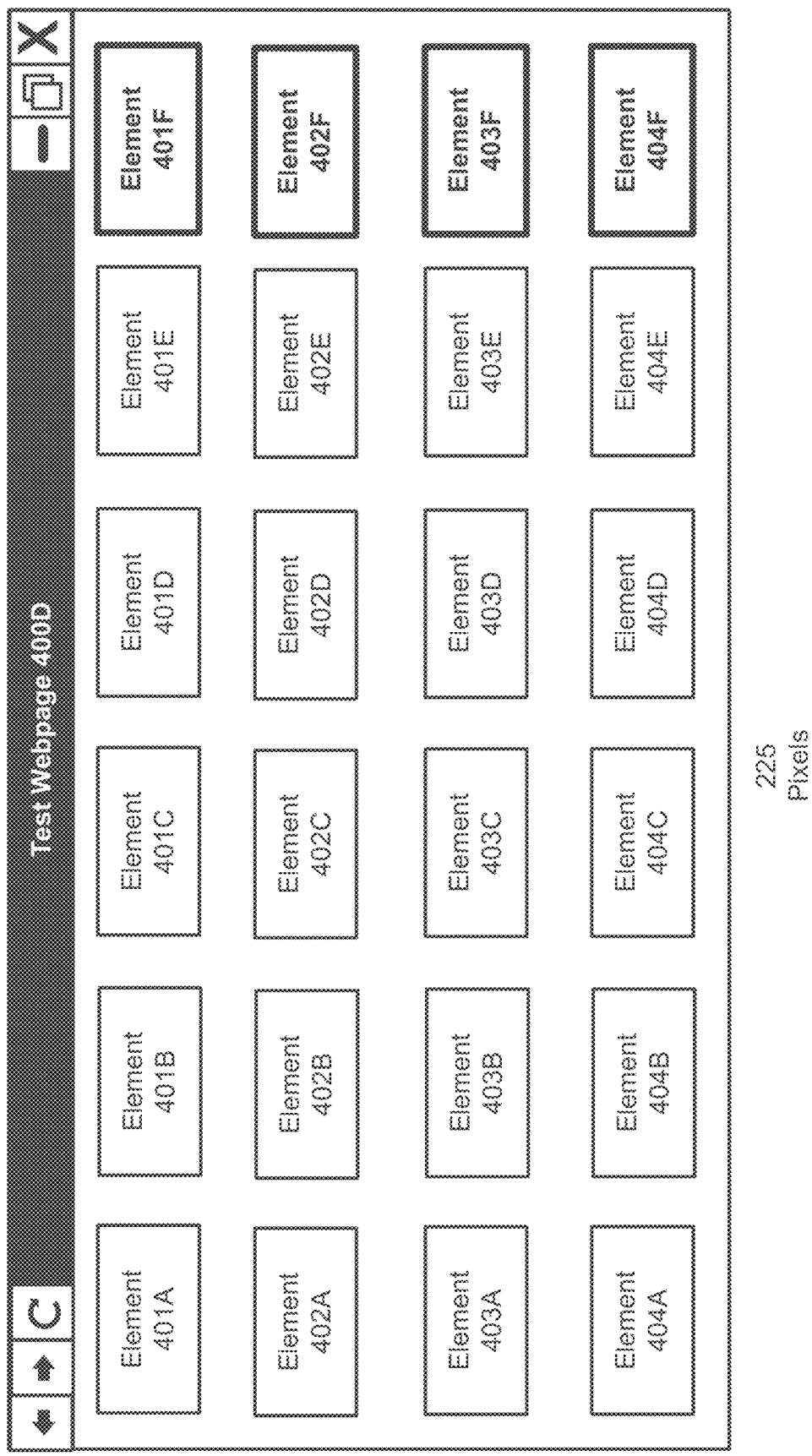

In FIG. 4D, the screen is resized to 100 pixels (vertically) by 225 pixels (horizontally). In other words, the width of the screen is increased from FIG. 4A. The test webpage 400D illustrates an example of how the layout of the test webpage 400A may be displayed on the resized screen. As illustrated in FIG. 4D an additional column of elements 401-404F is displayed. Alternatively, the originally displayed elements may be resized for the larger screen. Information about how the elements should be resized may also be obtained from the source code for the webpage.

Figure 4E:
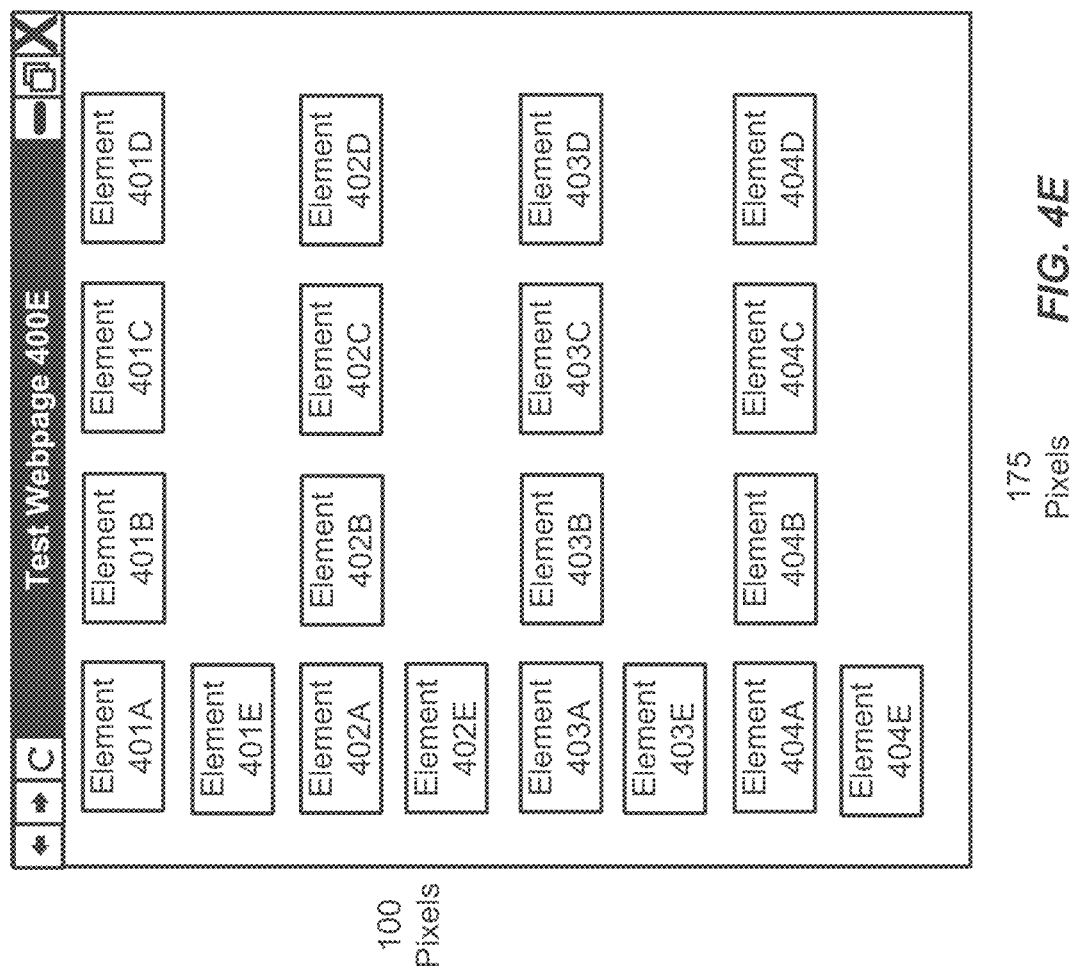

In FIG. 4E, the screen is resized to 100 pixels (vertically) by 175 pixels (horizontally). In other words, the width of the screen is narrower than FIG. 4A. The test webpage 400E illustrates an example of how the layout of the test webpage 400A may be displayed on the resized screen. As illustrated in FIG. 4E, the elements are not resized according to the decreased width and the column of elements 401-404E are shifted down to the next row and the overall row count is increased (from four rows in 400A to eight rows in 400E). The test script may detect the increased row count to detect an error. Additionally, or alternatively, the test script may detect that the relative location of elements has changed. For example, the relative location of element 401E is in the same row as elements 401A-D (the first row), however, after the resize, the location of the element 401E is now in second row, and there are no adjacent elements.

Figure 4F:
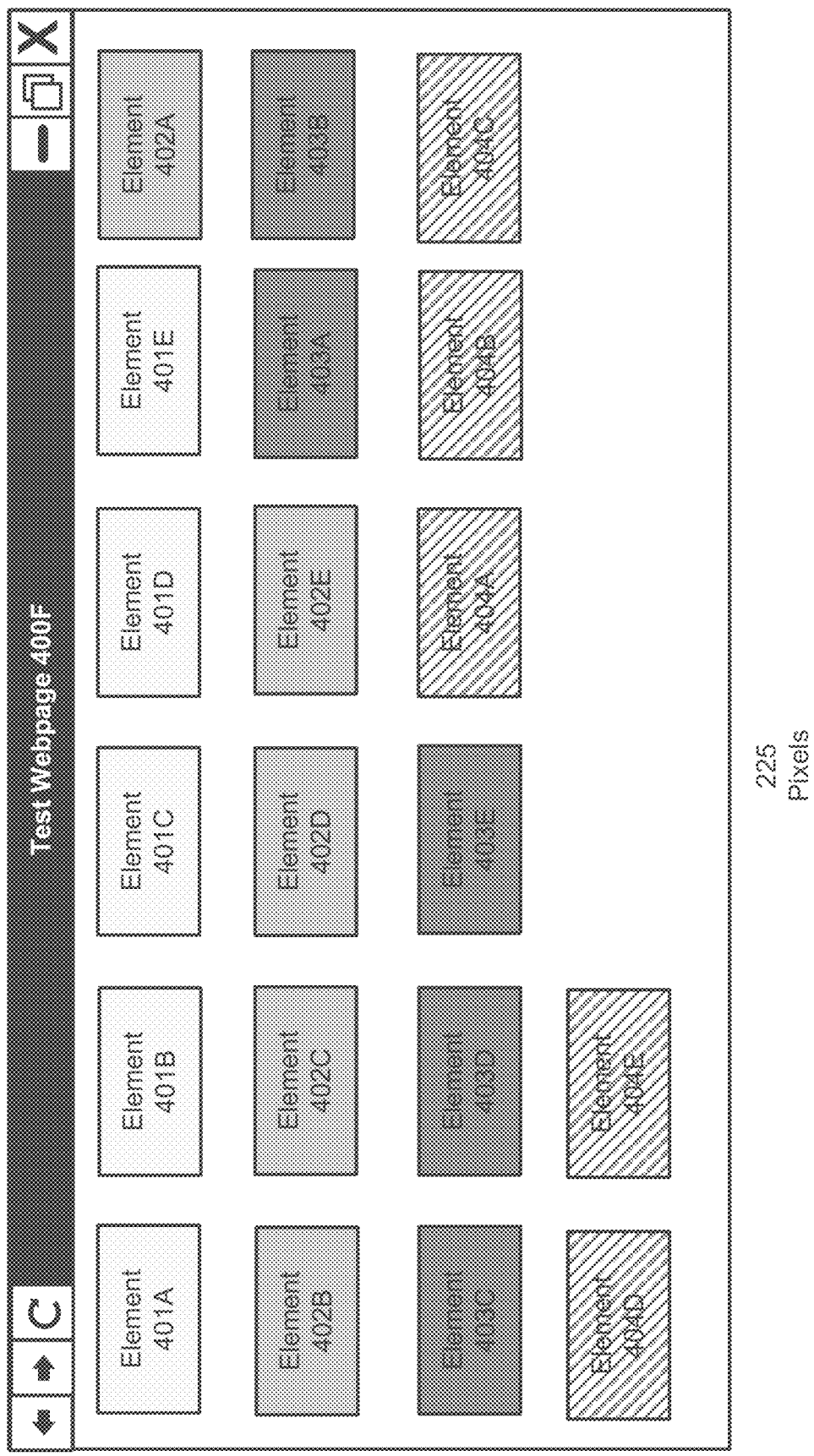

In FIG. 4F, the screen is resized to 100 pixels (vertically) by 225 pixels (horizontally). In other words, the width of the screen is wider than FIG. 4A. The test webpage 400F illustrates an example of how the layout of the test webpage 400A may be displayed on the resized screen. As illustrated in FIG. 4F, the elements are not resized according to the increased width and some elements are shifted up to the previous row. As illustrated element 402A formerly in the second row is now in the first row, and elements 402-b-E are shifted to the left. Elements 403A-B are shifted up and elements 403C-E are shifted to the left. Elements 404A-C are shifted up from the fourth row to the third row and elements 404D are shifted to the left. The test script may compare the relative location of each element to detect an error in the layout of the webpage.

Figure 5:
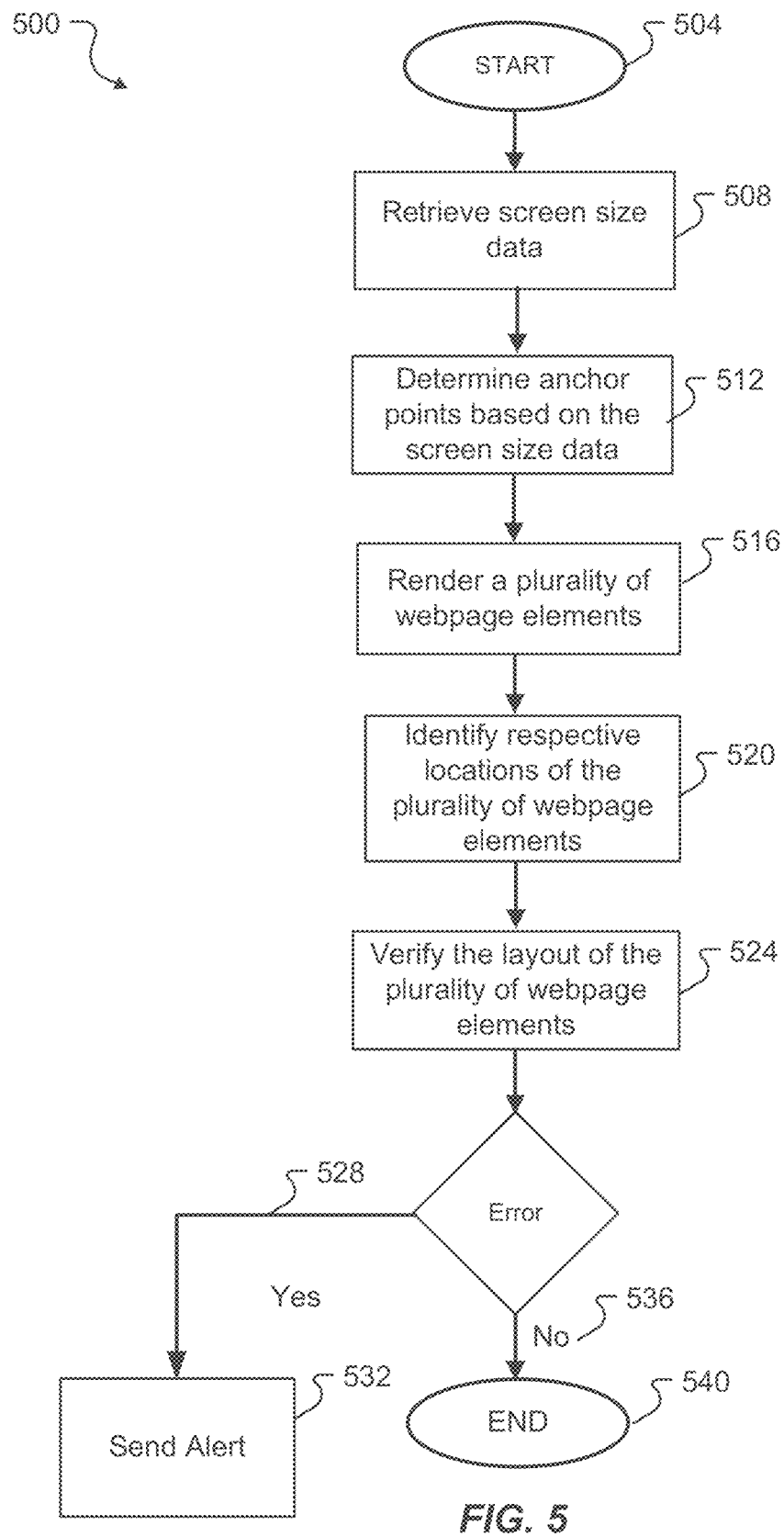
FIG. 5 flowchart illustrating an example process for the sonification of continuous integration data according to one embodiment of the present disclosure.

FIG. 5 is a flow diagram of a process 500 for automatically testing webpage layout on different screen sizes. As one of skill in the art would recognize, there may be various ways to implement a process to automatically test webpage layout.

While a general order for the steps of the process 500 for the operation of automatically testing the layout of a webpage is shown in FIG. 5, the process 500 can include more or fewer steps or can arrange the order of the steps differently than those shown in FIG. 5. Further, two or more steps may be combined into one step. Generally, the process 500 starts with a START operation 504 and ends with an END operation 540.

In step 508 screen size data is retrieved. For example, support screen size data may be determined from screen size data included in a CSS meta query. Additionally, or alternatively, an HTML, header may be parsed to determined supported screen size data.

In step 512 anchor points are determined based on the screen size data. For example, the screen may be resized (larger to smaller or smaller to larger) pixel by pixel and the anchor points are determined for each resize in order to verify the layout of a webpage. If elements are detected outside of the anchor points than that may indicate an error in the layout. Alternatively, or additionally, the relative locations of the elements may be compared to verify the layout. Additionally, the borders of the elements may be check for overlap to verify the layout of the webpage.

In step 516 each element of the webpage is rendered. For example, the source code for the webpage may be interpreted and the elements of the webpage displayed according to the display paraments of the test environment (e.g., screen size). In step 520 the respective location of each element is determined. For example, the test determines if an element disappeared. In other examples, an element may shift up/down or left/right. By comparing the relative location of each element, the layout of the webpage may be verified in step 524. If an error is detected (step 528), then in step 532 an alert is sent. For example, a visual and/or audio alert may be displayed/played. If no error is detected (step 536), then the process 500 ends (step 540). In addition to comparing the respective/relative location of each element, the border of each element is checked for overlap/being outside the border/anchor points of the webpage.

Figure 6:
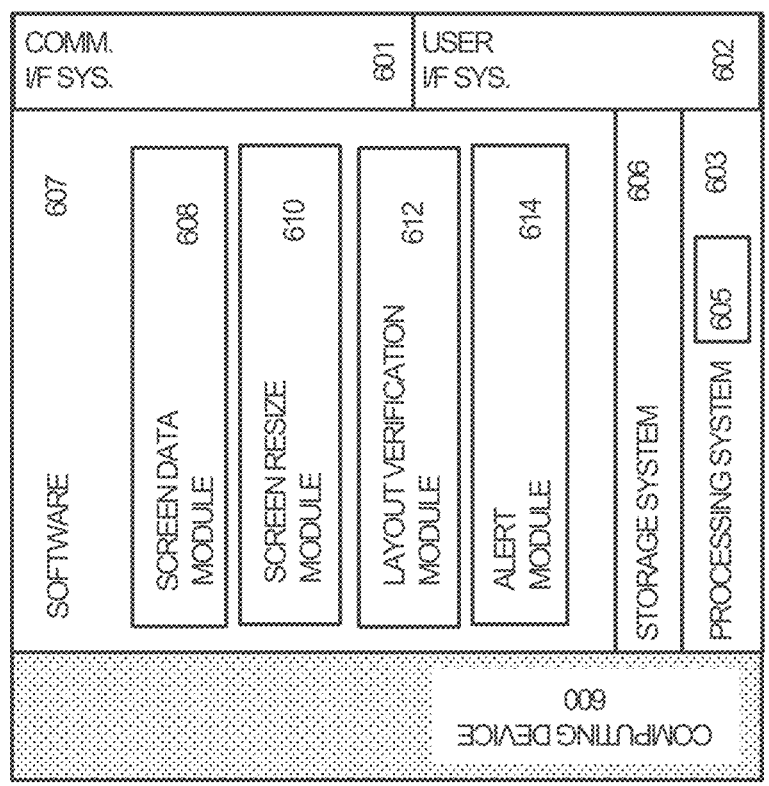
FIG. 6 is a block diagram illustrating an example computing device for the sonification of continuous integration data according to one embodiment of the present disclosure.

FIG. 6 depicts a computing device 600 in accordance with embodiments of the present disclosure. The computing device 600 performs the automatic testing of the layout of webpage in accordance with the embodiments disclosed herein. The computing device 600 receives supported screen size data for a webpage. For example, the computing device 600 may retrieve the screen size data from supported screen size data included in a CSS meta query. The computing device 600 may store the screen size data and webpage layout data in storage system 606 and display/play an alert via the user interface system 602 (e.g., display and/or a speaker or headphones connected to computing device 600). Similar computing systems may be included in devices 104, 108, and 112, in whole or in part, described herein to perform the automatic testing of a webpage layout.

A computing system 600 is representative of any computing system or systems with which the various operational architectures, processes, scenarios, and sequences disclosed herein to perform the automatic testing of a layout of a webpage on different screen sizes comprising various components and connections to other components and/or systems.

The computing system 600 comprises a communication interface 601, a user interface system 602, and a processing system 603. The processing system 603 is linked to the communication interface 601 and user interface system 602. The processing system 603 includes a microprocessor and/or processing circuitry 605 and a storage system 606 that stores operating software 607. The computing system 600 may include other well-known components such as a battery and enclosure that are not shown for clarity. The computing system 600 may comprise a server, a user device, a desktop computer, a laptop computer, a tablet computing device, or some other user communication apparatus.

The communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In some implementations, the communication interface 601 is configured to communicate with other devices, wherein the communication interface 601 is used to retrieve screen size and webpage layout data.

The user interface system 602 comprises components that interact with a user to display a rendered webpage and/or alerts and receive input from the user. The user interface system 602 may include a speaker, microphone, buttons, lights, display screen, touch screen, touch pad, scroll wheel, communication port, or some other user input/output apparatus—including combinations thereof.

The processing circuitry 605 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via a bus, executes instructions, and outputs data, again such as via the bus. In other embodiments, the processing circuitry 605 may comprise a shared processing device that may be utilized by other processes and/or process owners, such as in a processing array or distributed processing system (e.g., "cloud," farm, etc.). It should be appreciated that the processing circuitry 605 is a non-transitory computing device (e.g., electronic machine comprising circuitry and connections to communicate with other components and devices). The processing circuitry 605 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor and the hardware and other circuitry thereof.

The processing circuitry 605 comprises a microprocessor and other circuitry that retrieves and executes the operating software 607 from the storage system 606. The storage system 606 may include volatile and nonvolatile, removable, and non-removable media implemented in any method or technology for storage of information, such as computer readable instructions, data structures, program modules, or other data. The storage system 606 may be implemented as a single storage device, but may also be implemented across multiple storage devices or sub-systems. The storage system 606 may comprise additional elements, such as a controller to read the operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

The processing circuitry 605 is typically mounted on a circuit board that may also hold the storage system 606 and portions of the communication interface 601 and the user interface 602. The operating software 607 comprises computer programs, firmware, or some other form of machine-readable program instructions. The operating software 607 includes screen data module 608, screen resize module 610, layout verification module 612, and alert module 614, although any number of software modules within the application may provide the same operation. The operating software 607 may further include an operating system, utilities, drivers, network interfaces, applications, or some other type of software. When executed by the processing circuitry 605, the operating software 607 directs the processing system 603 to operate the computing device 600 as described herein.

In at least one implementation, the screen size module 608, when read and executed by the processing system 603, directs the processing system 603 to receive/retrieve screen size and/or webpage layout data associated with a webpage to be tested. The screen size module 610 when read and executed by the processing system 603, directs the processing system 603 to resize the webpage window (pixel by pixel) and render the webpage elements. Layout verification module 612 applies techniques such as, but not limited to, relative location, element/webpage borders, anchor points, etc. to verify the relative location of each of the webpage elements and layout of the webpage. The alert generation module 614, when read and executed by the processing system 603, directs the processing system 603 to generate visual and/or audio alert if an error in the layout is detected.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system, the system comprising:
a processor; and
a memory coupled with and readable by the processor and storing therein a set of instructions which, when executed by the processor, causes the processor to verify a layout of a plurality of elements of a webpage by:
retrieving screen size data associated with the webpage, wherein the retrieved screen size data indicates one or more supported screen sizes for the webpage;
determining anchor points for the webpage based on the retrieved screen size data, wherein the determined anchor points specify borders of the webpage, and wherein the determined anchor points are specific to each of the one or more supported screen sizes for the webpage;
rendering the plurality of elements of the webpage based on the retrieved screen size data and the determined anchor points;
identifying a respective location of each of the plurality of elements of the webpage;
verifying the layout of the plurality of elements of the webpage based on anchor points and the respective location of each of the plurality of elements of the webpage; and
in response to detecting an error in the layout of the plurality of elements of the webpage resulting from a change in screen size, collapsing two or more elements into an expandable menu, wherein the error in the layout of the plurality of elements of the webpage comprises at least one of: at least one of the two or more elements not being within the determined anchor points, the two or more elements overlapping, and at least one of the two or more elements shifting downward in the layout of the plurality of elements.

2. The system of claim 1, wherein retrieving the screen size data associated with the webpage further comprises:
parsing the screen size data from a Cascading Style Sheets (CSS) meta query associated with the webpage.

3. The system of claim 1, wherein retrieving the screen size data associated with the webpage further comprises:
parsing a Hypertext Transfer Protocol (HTTP) header to retrieve the screen size data associated with the webpage.

4. The system of claim 1, wherein verifying the layout of the plurality of elements of the webpage further comprises:
determining a relative location of each of the plurality of elements of the webpage to determine that each element has a correct relative location.

5. The system of claim 1, wherein verifying the layout of the plurality of elements of the webpage further comprises:
determining if any element of the plurality of elements of the webpage overlaps another element of the plurality of elements of the webpage.

6. The system of claim 1, wherein verifying the layout of the plurality of elements of the webpage further comprises:
determining a location of each element of the plurality of elements of the webpage; and
determining if the location of any element of the plurality of elements is not located within the determined anchor points.

7. The system of claim 1, wherein rendering the webpage based on the retrieved screen size data further comprises:
rendering the webpage based on a starting screen size; and
successively rendering the webpage by increasing the starting screen size pixel by pixel until a screen size equal to one of the one or more supported screen sizes is reached.

8. A method to verify a layout of a plurality of elements of a webpage, the method comprising:
retrieving screen size data associated with a webpage, wherein the retrieved screen size data indicates one or more supported screen sizes for the webpage;
determining anchor points for the webpage based on the retrieved screen size data, wherein the determined anchor points specify borders of the webpage, and wherein the determined anchor points are specific to each of the one or more supported screen sizes for the webpage;
rendering the plurality of elements of the webpage based on the retrieved screen size data and the determined anchor points;
identifying a respective location of each of the plurality of elements of the webpage;
verifying the layout of the plurality of elements of the webpage based on anchor points and the respective location of each of the plurality of elements of the webpage; and
in response to detecting an error in the layout of the plurality of elements of the webpage resulting from a change in screen size, collapsing two or more elements into an expandable menu, wherein the error in the layout of the plurality of elements of the webpage comprises at least one of: at least one of the two or more elements not being within the determined anchor points, the two or more elements overlapping, and at least one of the two or more elements shifting downward in the layout of the plurality of elements.

9. The method of claim 8, wherein retrieving the screen size data associated with the webpage comprises parsing the screen size data from a Cascading Style Sheets (CSS) meta query associated with the webpage.

10. The method of claim 8, wherein retrieving the screen size data associated with the webpage comprises parsing a Hypertext Transfer Protocol (HTTP) header to retrieve the screen size data associated with the webpage.

11. The method of claim 8, wherein verifying the layout of the plurality of elements of the webpage comprises determining a relative location of each of the plurality of elements of the webpage so that each element has a correct relative location.

12. The method of claim 8, wherein verifying the layout of the plurality of elements of the webpage comprises determining if any element of the plurality of elements of the webpage overlaps another element of the plurality of elements of the webpage.

13. The method of claim 8, wherein verifying the layout of the plurality of elements of the webpage comprises:
determining a location of each element of the plurality of elements of the webpage; and
determining if the location of any element of the plurality of elements is not located within the determined anchor points.

14. The method of claim 8, wherein rendering the webpage based on the retrieved screen size data comprises:
rendering the webpage based on a starting screen size; and
successively rendering the webpage by increasing the starting screen size pixel by pixel until a screen size equal to one of the one or more supported screen sizes is reached.

15. A non-transitory, computer-readable medium comprising a set of instructions stored therein which, when executed by a processor, causes the processor to verify a layout a plurality of elements of a webpage by:
retrieving screen size data associated with the webpage, wherein the retrieved screen size data indicates one or more supported screen sizes for the webpage;
determining anchor points for the webpage based on the retrieved screen size data, wherein the determined anchor points specify borders of the webpage, and wherein the determined anchor points are specific to each of the one or more supported screen sizes for the webpage;
rendering the plurality of elements of the webpage based on the retrieved screen size data and the determined anchor points;
identifying a respective location of each of the plurality of elements of the webpage;
verifying the layout of the plurality of elements of the webpage based on anchor points and the respective location of each of the plurality of elements of the webpage; and
in response to detecting an error in the layout of the plurality of elements of the webpage resulting from a change in screen size, collapsing two or more elements into an expandable menu, wherein the error in the layout of the plurality of elements of the webpage comprises at least one of: at least one of the two or more elements not being within the determined anchor points, the two or more elements overlapping, and at least one of the two or more elements shifting downward in the layout of the plurality of elements.

16. The non-transitory, computer-readable medium of claim 15, wherein retrieving the screen size data associated with the webpage further comprises:

parsing the screen size data from a Cascading Style Sheets (CSS) meta query associated with the webpage.

17. The non-transitory, computer-readable medium of claim 15, wherein retrieving the screen size data associated with the webpage further comprises:

parsing a Hypertext Transfer Protocol (HTTP) header to retrieve the screen size data associated with the webpage.

18. The non-transitory, computer-readable medium of claim 15, wherein verifying the layout of the plurality of elements of the webpage further comprises:

determining a relative location of each of the plurality of elements of the webpage to determine that each element has a correct relative location.

19. The non-transitory, computer-readable medium of claim 15, wherein verifying the layout of the plurality of elements of the webpage further comprises:

determining if any element of the plurality of elements of the webpage overlaps another element of the plurality of elements of the webpage.

20. The non-transitory, computer-readable medium of claim 15, wherein verifying the layout of the plurality of elements of the webpage further comprises:

determining a location of each element of the plurality of elements of the webpage; and determining if the location of any element of the plurality of elements is not located within the determined anchor points.

* * * * *